United States Patent
Ondrasik, Jr.

(10) Patent No.: US 12,391,295 B1
(45) Date of Patent: Aug. 19, 2025

(54) SHOPPING CART WITH TELESCOPIC FRONT BASKET

(71) Applicant: THE ONDRASIK FAMILY TRUST DATED 11/3/1999, Commerce, CA (US)

(72) Inventor: V. John Ondrasik, Jr., Granada Hills, CA (US)

(73) Assignee: THE ONDRASIK FAMILY, Commerce, CA (US), trust dated 11/3/1999

( * ) Notice: Subject to any disclaimer, the term of this patent is extended or adjusted under 35 U.S.C. 154(b) by 0 days.

(21) Appl. No.: 19/173,665

(22) Filed: Apr. 8, 2025

Related U.S. Application Data

(60) Provisional application No. 63/631,862, filed on Apr. 9, 2024.

(51) Int. Cl.
B62B 3/14 (2006.01)

(52) U.S. Cl.
CPC .................. B62B 3/1468 (2013.01)

(58) Field of Classification Search
CPC .................................................. B62B 3/1468
See application file for complete search history.

(56) References Cited

U.S. PATENT DOCUMENTS

| | | | | |
|---|---|---|---|---|
| 1,925,371 A | * | 9/1933 | Charter | F25D 25/02 126/339 |
| 2,871,024 A | * | 1/1959 | Young | B62B 3/1468 280/33.996 |
| 2,903,269 A | * | 9/1959 | Hennion | B62B 3/1468 280/33.996 |
| 2,918,294 A | * | 12/1959 | Hennion | B62B 3/1488 280/47.35 |
| 2,958,536 A | * | 11/1960 | Young | B62B 3/18 280/33.995 |
| 3,026,122 A | * | 3/1962 | Young | B62B 3/1468 280/33.996 |
| 4,938,492 A | * | 7/1990 | Le Marchand | B62B 3/1468 211/151 |
| 5,265,893 A | * | 11/1993 | Ettlin | B62B 3/18 108/90 |
| 5,385,358 A | * | 1/1995 | Adamson | B62B 3/148 280/47.35 |

(Continued)

FOREIGN PATENT DOCUMENTS

DE 102005033031 B3 * 3/2007 ........... B62B 3/1468

OTHER PUBLICATIONS

Precision Wire Products, Inc., Model 758M Shopping Cart brochure, Nov. 10, 2018, 1 page.

(Continued)

Primary Examiner — Brian L Swenson
(74) Attorney, Agent, or Firm — David R. Heckadon; Gordon Rees Scully Mansukhani LLP

(57) ABSTRACT

A shopping cart having a main basket with an upper rim extending therearound and a telescoping basket positioned in a front portion of the main basket. The telescoping basket includes: (a) a front portion attached to the front of the main basket below the upper rim, and (b) a rear portion slidably attached to the front portion, wherein the rear portion is slidably moveable between a retracted position and an extended position.

6 Claims, 12 Drawing Sheets

(56) References Cited

U.S. PATENT DOCUMENTS

| | | | | |
|---|---|---|---|---|
| 6,354,612 | B1* | 3/2002 | Adamson | B62B 3/1468 |
| | | | | 280/47.35 |
| 6,450,513 | B1* | 9/2002 | Bernstein | B62B 3/1472 |
| | | | | 40/308 |
| 9,802,635 | B1* | 10/2017 | White | B62B 3/1468 |
| 10,618,540 | B2* | 4/2020 | Bacallao | B62B 3/004 |
| 2010/0276899 | A1* | 11/2010 | Burdwood | B62B 3/1468 |
| | | | | 280/33.991 |
| 2018/0093689 | A1* | 4/2018 | Campbell | B62B 3/18 |
| 2022/0087415 | A1* | 3/2022 | Guo | A47G 23/06 |

OTHER PUBLICATIONS

Precision Wire Products, Inc., Model 468W Shopping Cart brochure, May 1, 2008, 1 page.

* cited by examiner

SHOPPING CART WITH TELESCOPIC FRONT BASKET

RELATED APPLICATION

The present application claims priority to U.S. Provisional Patent Application Ser. No. 63/631,862, of same title, filed Apr. 9, 2024, the entire disclosure of which is incorporated herein by reference in its entirety for all purposes.

TECHNICAL FIELD

The present invention relates to shopping carts.

BACKGROUND OF THE INVENTION

Traditional shopping carts have a large, bottom shelf that is typically used to carry bulky items such as bottles of water, rolls of toilet paper or rolls of paper towels. Such large bottom shelves have the advantage of being open from the sides and are therefore well suited to carry these bulky items. Unfortunately, a disadvantage of these large bottom shelves is that customers must stoop down to load and unload them. Heavy items (such as packs of water bottles) can be difficult to lift, especially when stored at this location which is often just a few inches above the ground. Customers simply do not wish to be bending over in the checkout line to retrieve goods stored on the bottom shelf. Such maneuvers can be especially difficult for customers that are elderly or disabled.

Placing large, heavy items (such as packs of water bottles) directly into the main basket of the shopping cart instead also has its disadvantages. Specifically, the customer still has to bend down to grab underneath these items to lift them. In addition, such large, bulky items also take up significant space in the main basket and can tip over and damage other items such as eggs and fresh produce.

Systems currently exist having small shelves in the front of the shopping cart basket. One example is found in U.S. Pat. No. 9,802,635 to White. The present Applicant has also been selling shopping carts with small front shelves since as early as 2008. The disadvantage of these shelves is that they can be too large (thereby blocking access to the large basket when not needed), or too small (thereby holding insufficient amounts of goods on them or being unable to hold wide goods such as packs of water bottles). What is instead desired is a shopping cart that is able to conveniently store large, bulky and heavy items at a preferred ideal height for lifting them. Such a solution would not simply fill the main basket of the shopping cart with them either, as this would significantly reduce the space available to the consumer. As will be explained, the present system addresses these concerns and provides a novel solution to these problems.

SUMMARY OF THE INVENTION

In preferred aspects, the present system provides a shopping cart having a telescoping basket, comprising: (a) a shopping cart having a main basket with an upper rim extending therearound; and (b) a telescoping basket positioned in a front portion of the main basket, wherein the telescoping basket comprises: (i) a front portion attached to the front of the main basket below the upper rim, and (ii) a rear portion slidably attached to the front portion, wherein the rear portion is slidably moveable between a retracted position and an extended position. Preferably, the slidable rear portion of the telescoping basket comprises an elevated rear safety bar that prevents goods stored on the telescoping basket from falling down into the main basket of the shopping cart.

Preferably, the front portion of the telescoping basket is attached to the front of the main basket several inches below the upper rim of the main basket. As such, the top few inches of the front and sides of the main basket act as short walls around the telescoping basket (thereby operating similar to the rear safety bar at the back of the telescoping basket).

Preferably, the present telescoping basket is a wire basket and the rear portion of the telescoping basket may be anchored in a slot (or slots) in the rear of the front portion of the telescoping basket. A stop on the rear portion may be used to prevent the rear portion from falling out of the slot in the front portion. This approach permits the rear portion of the basket to slide in and out (i.e.: telescope) with respect to the front portion, while ensuring that the rear portion does not simply fall out of the slot(s) in the front portion of the basket. Alternatively, however, one portion of the telescoping basket may have wires or other forms of connectors that wrap fully or partially around wires on the other portion of the telescoping basket to hold the front and rear portions together. The advantage of the present system is that the rear portion of the telescoping basket can be pulled fully backwards to increase the size of the basket (i.e.: to store larger items on it) or pushed fully forwards (i.e.: to push it out of the way when not in use, thereby providing less obstructed access to the main basket). The rear portion of the telescoping basket may have a raised safety bar to prevent goods from falling off of the telescoping shelf. In addition, the rear portion of the basket can be moved to various positions between fully extended and fully retracted. This enables the user to set the preferred size of the telescoping basket—to best accommodate the size of the goods stored on it.

DETAILED DESCRIPTION OF THE INVENTION

Figure 1:
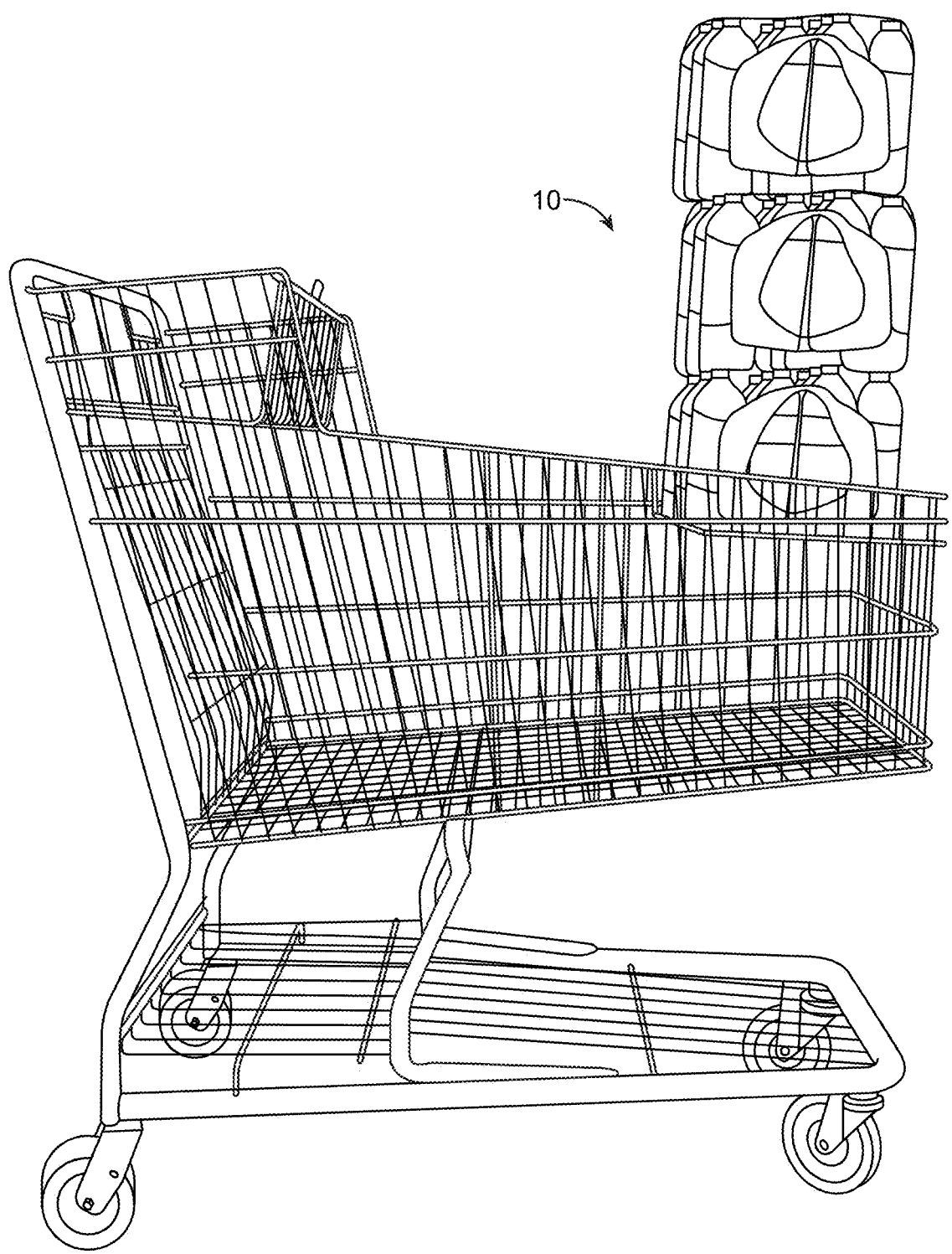
FIG. 1 is a side elevation view of the shopping cart with a telescoping front basket supporting a stack of water bottles thereon.
Figure 2:
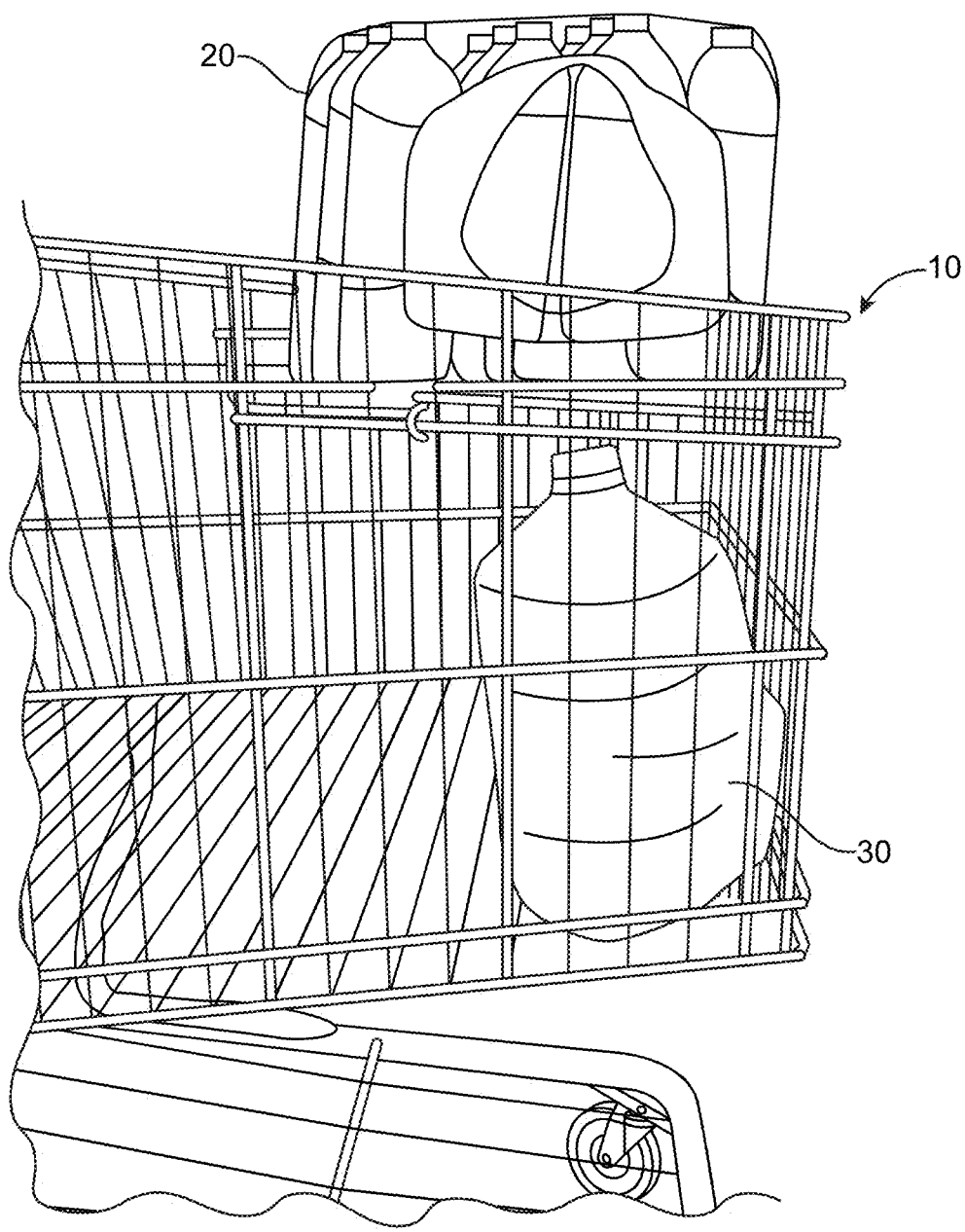
FIG. 2 is a close-up side elevation view of the telescoping front basket with a pack of water bottles supported thereon and a milk bottle resting in the main basket below.
Figure 3:
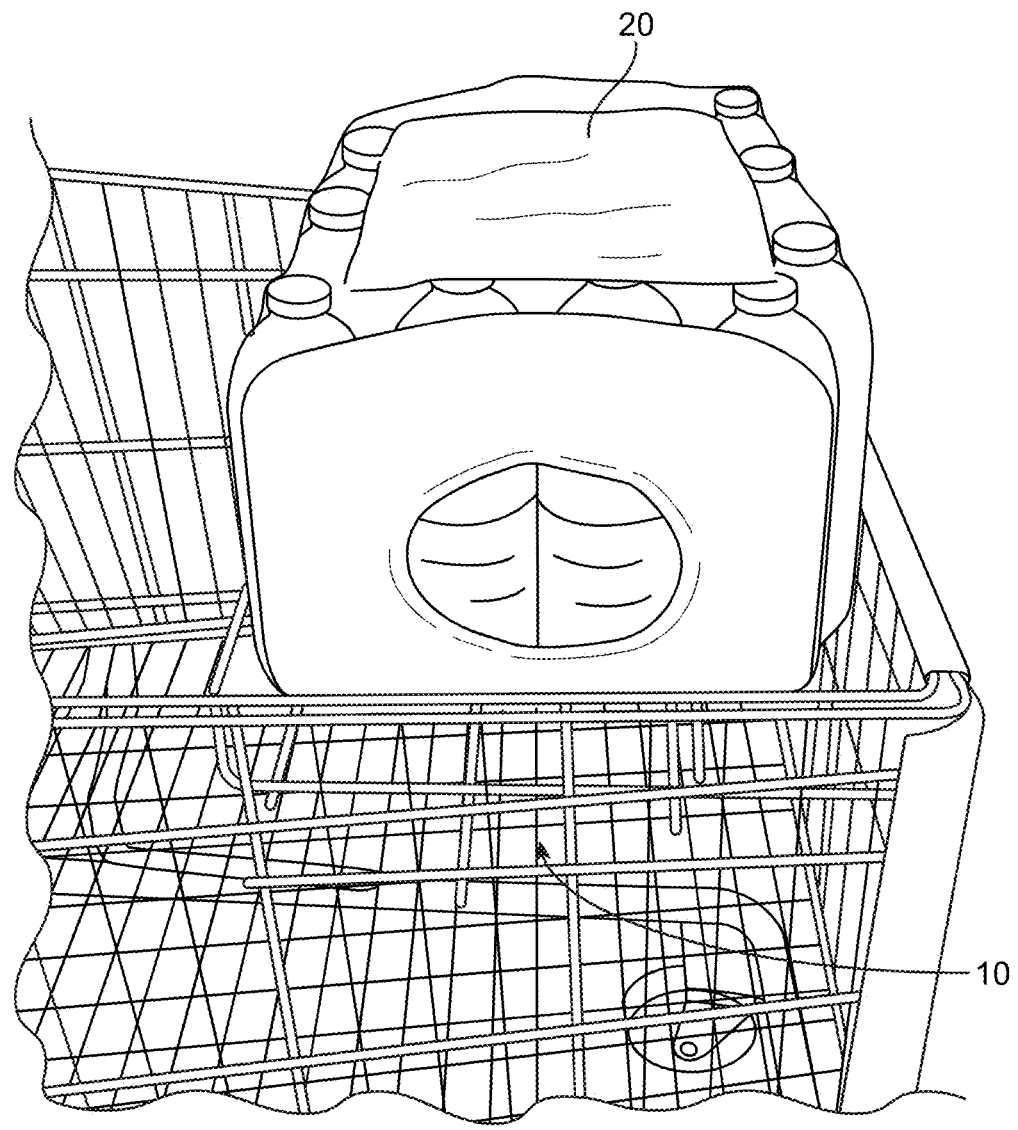
FIG. 3 is a perspective view similar to FIGS. 1 and 2 showing water bottles sitting on the telescoping front basket.

FIGS. 1 to 3 show various goods 20 stored on top of the present telescoping front basket 10. As can be seen in FIG. 1, the present telescoping basket is strong and sturdy and can support a large number of heavy water bottles thereon. Moreover, as can also be seen, these water bottles are stored at an ideal height (such that the user does not have to stoop down and lift them up from the bottom shelf underneath the shopping cart at checkout).

Figure 4:
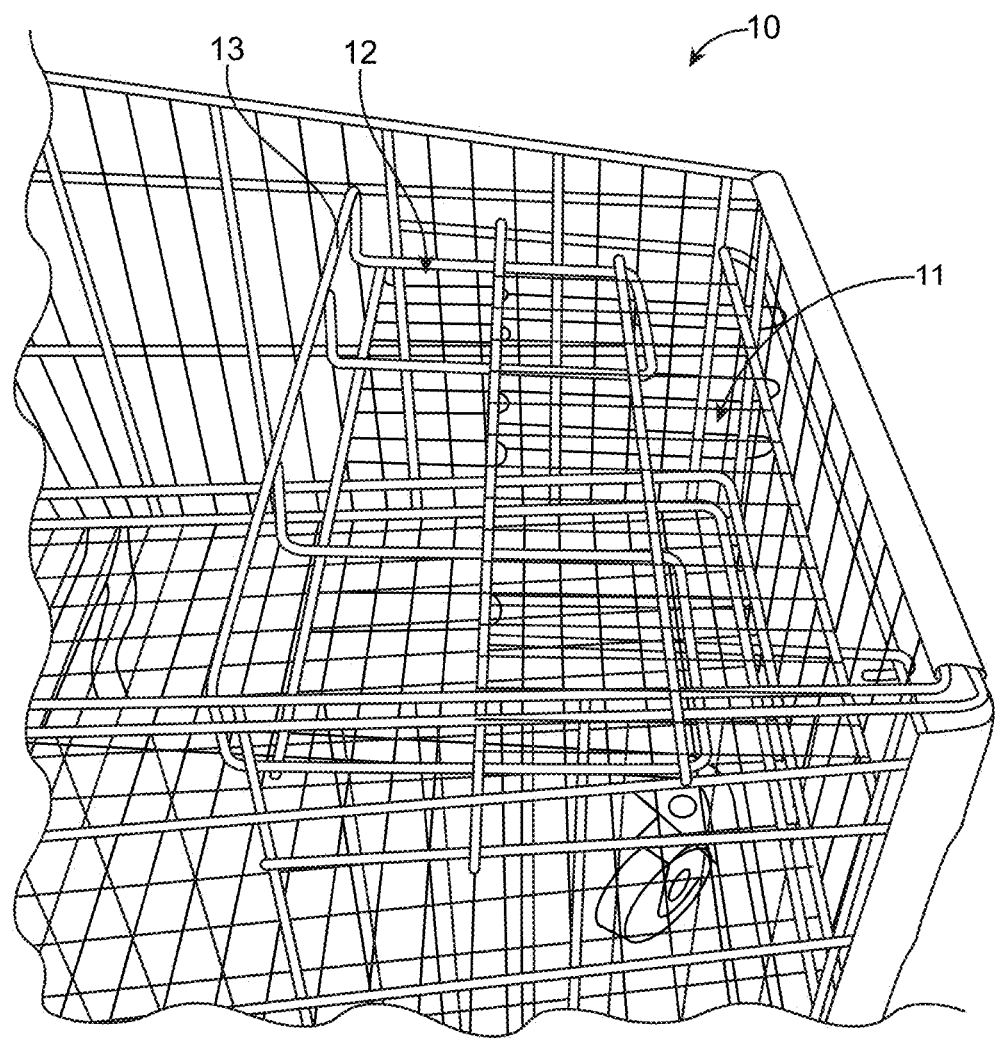
FIG. 4 is a perspective view showing the telescoping front basket in its extended position.
Figure 5:
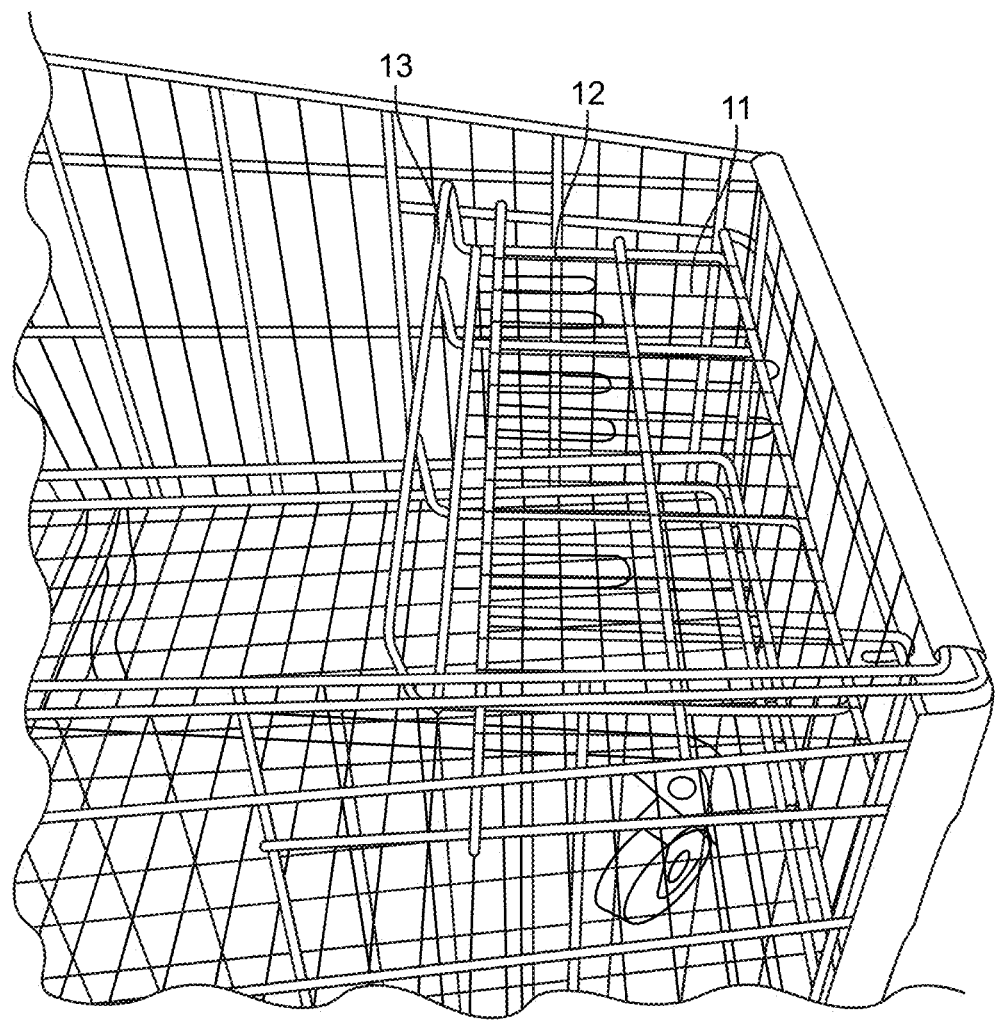
FIG. 5 is a perspective view showing the telescoping front basket in its retracted position.

FIGS. 4 and 5 show telescoping front basket 10 in its open, extended position (FIG. 4) and it's stored, out-of-the-way position (FIG. 5). It is to be understood that the present telescoping front basket 10 is useful and fully operational in all positions between its fully extended (FIG. 4) and fully retracted (FIG. 5) positions. As such, it is ideally suited to supporting goods of different widths.

In preferred aspects, the present system provides a shopping cart having a telescoping basket 10, comprising: a shopping cart having a main basket with an upper rim extending therearound; and a telescoping basket 10 positioned in a front portion of the main basket, wherein the telescoping basket comprises: a front portion 11 attached to the front of the main basket below the upper rim, and a rear portion 12 slidably attached to front portion 11. The rear portion 12 is slidably moveable between a retracted position (FIG. 5) and an extended position (FIG. 4).

Preferably as well, the rear portion 12 of the telescoping basket 10 comprises an elevated rear safety bar 13 which prevents good sitting in the telescoping basket 10 from falling backwards down into the main basket of the shopping cart. Safety bar 13 can also be grasped onto by a user to move telescoping basket 10 between its extended and retracted positions.

As can also be seen, the front portion 11 of the telescoping basket is preferably attached to the front of the main basket several inches below the upper rim of the main basket. As such, a short supporting wall is provided around all four sides of the telescoping basket (by safety bar 13 at the back and the top few inches of the main basket at the front and sides). As such, goods stored on top of telescoping basket 10 do not fall off the front, rear or sides of the basket. As seen in FIG. 2, the height of telescoping basket 10 within the main basket of the shopping cart is also high enough to store larger products (such as milk jug 30) directly underneath the telescoping basket 10. As such, telescoping basket 10 does not significantly inhibit or restrict use of the main basket of the shopping cart.

As can be seen, the front and sides of the front portion 11 of telescoping basket 10 are attached to the main basket. Telescoping basket 10 is preferably a wire basket and the rear portion 12 of the telescoping basket is supported by the front portion 11 of the telescoping basket in a manner that permits the rear portion 12 to slide in and out with respect to the stationary front portion 11. As such, the rear portion 12 of the telescoping basket need only be connected to the front portion 11 of the telescoping basket.

Figure 6:
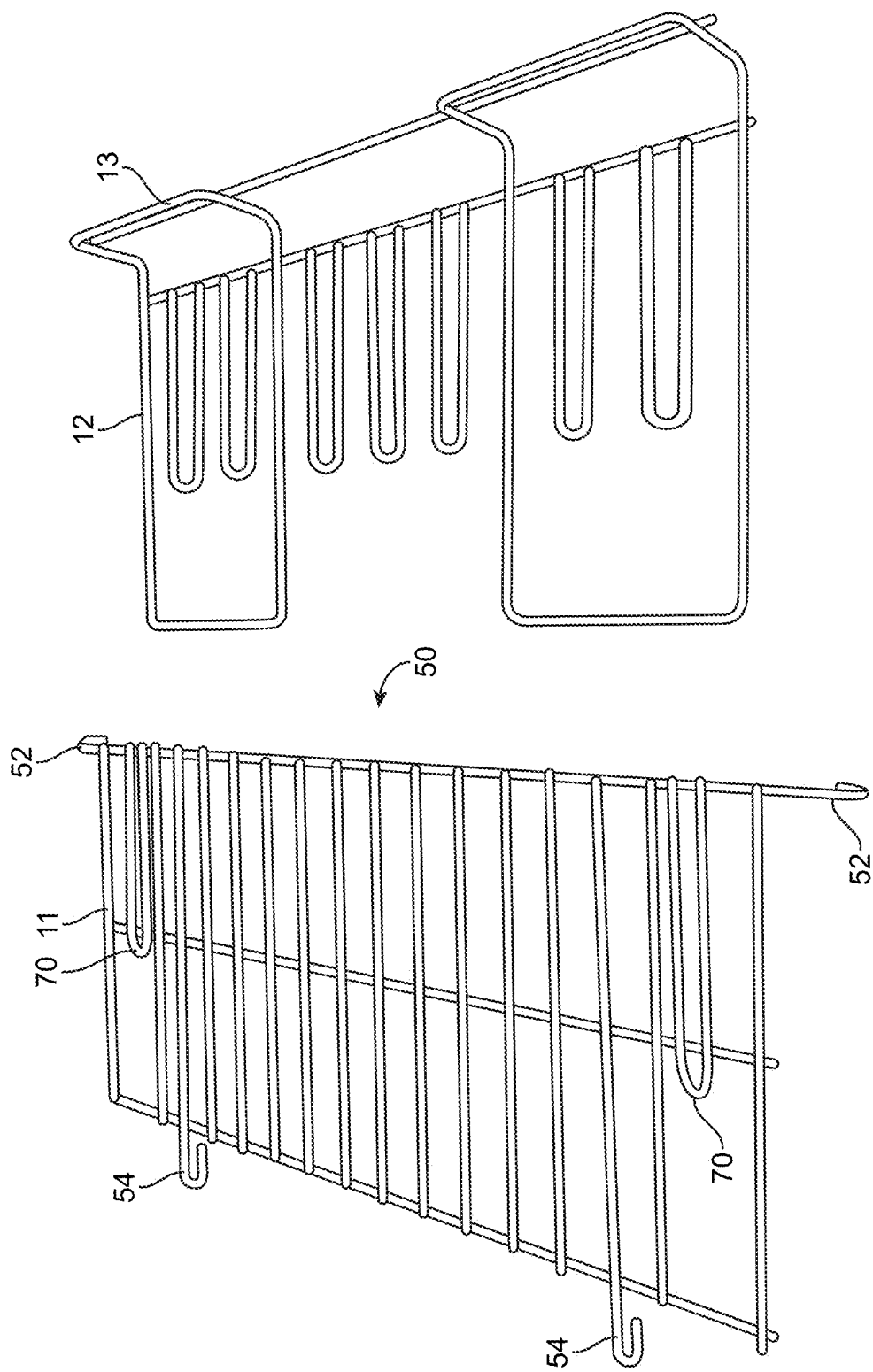
FIG. 6 is a perspective view of the front and rear portions of the telescoping front basket separated prior to assembly.
Figure 7:
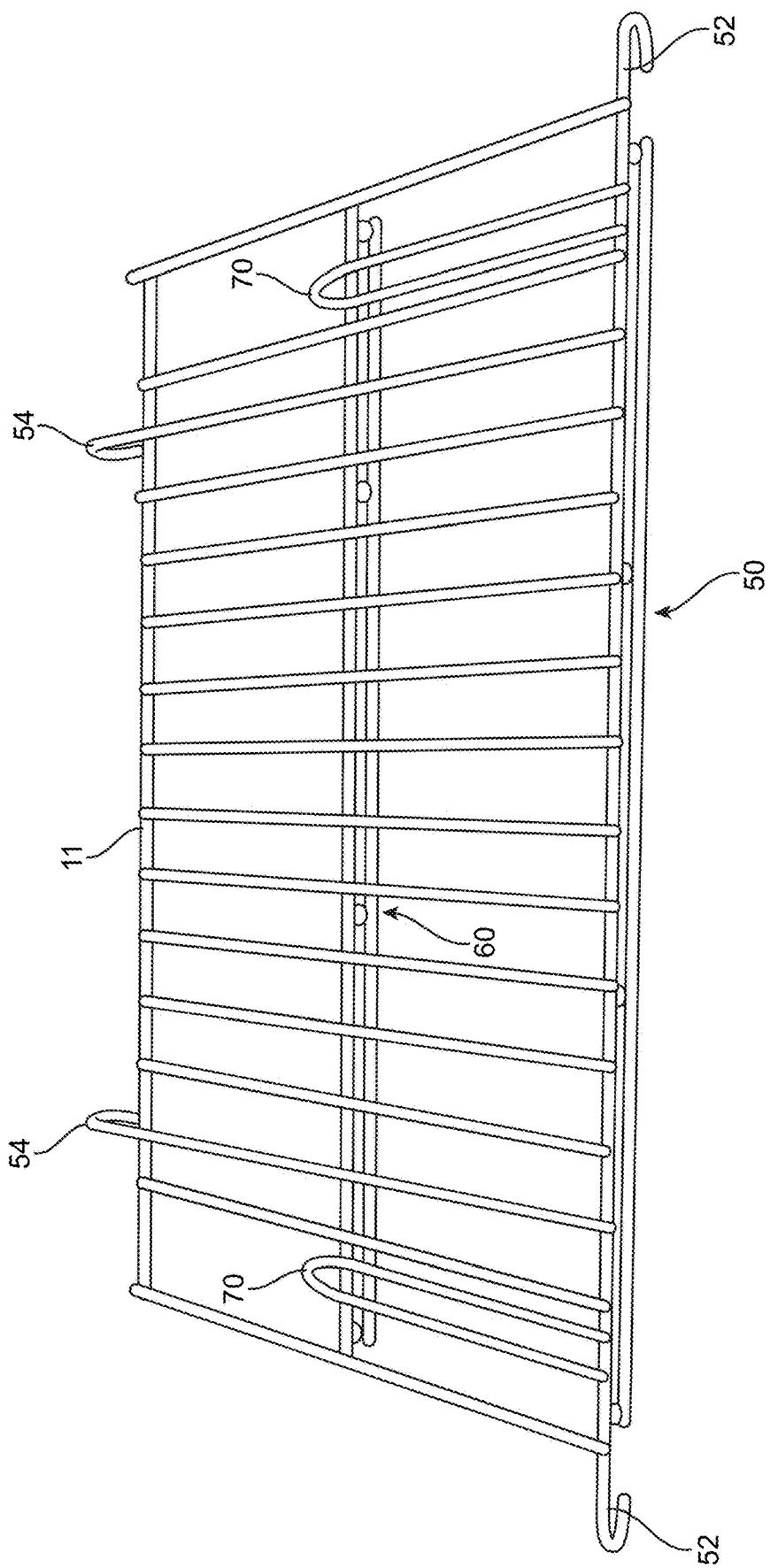
FIG. 7 is a rear perspective view of the front portion of the telescoping basket.

FIG. 6 is a perspective view of the front portion 11 and rear portion 12 of the telescoping front basket separated prior to assembly. As seen in FIG. 7, front portion 11 has a rear slot 50 into which rear portion 23 is inserted. Also provided are hooks 52 for attaching front portion 11 onto the sides of the shopping cart and hooks 54 for attaching the front portion 11 onto the front of the shopping cart. A second slot 60 also seen along a mid-portion of front portion 11. Rear portion 12 of the telescoping basket is received in the slots 50 and 60.

Figure 8:
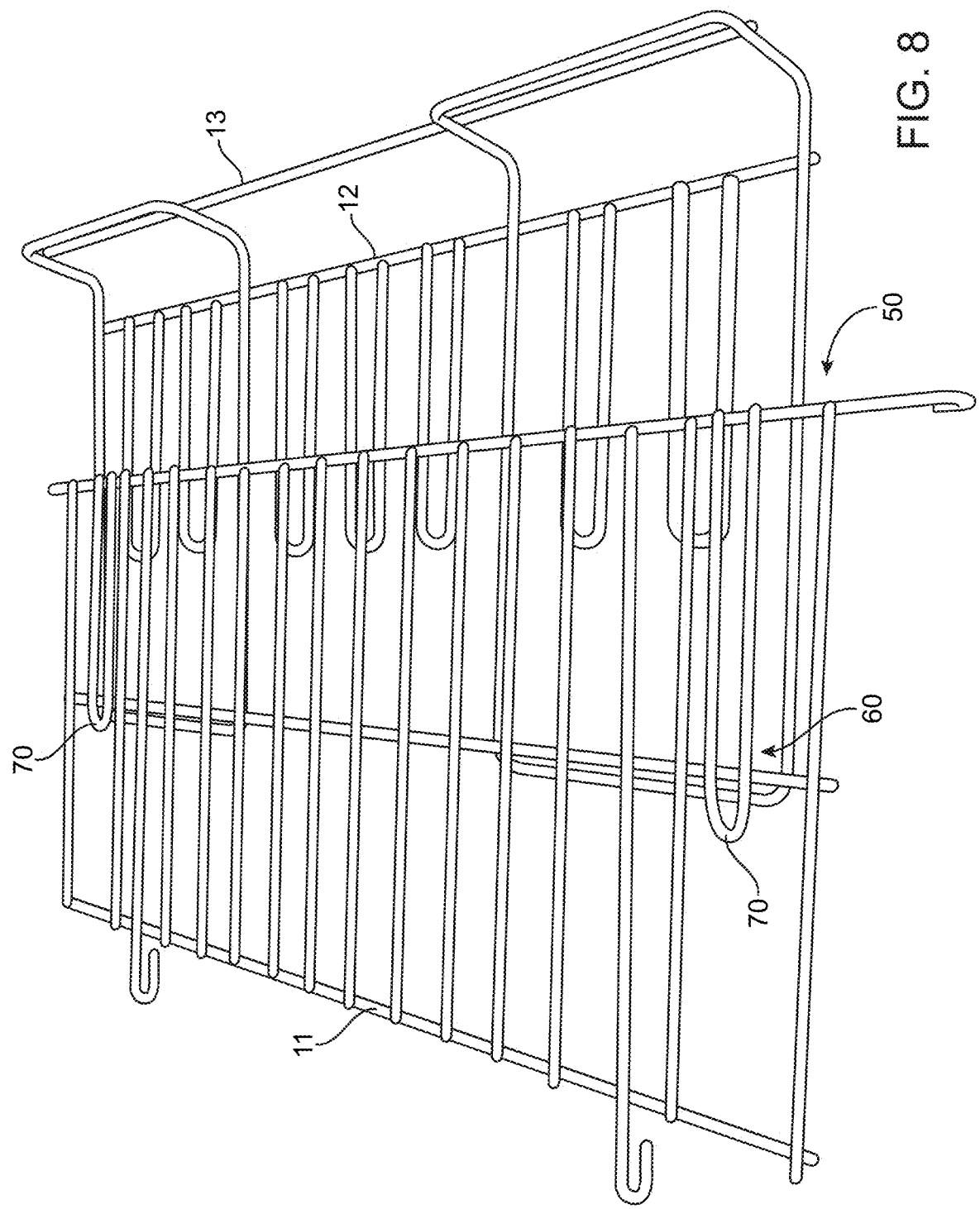
FIG. 8 is a perspective view of the front and rear portions of the telescoping front basket after being assembled together (with the rear portion partially inserted into a slot in the front portion).
Figure 9:
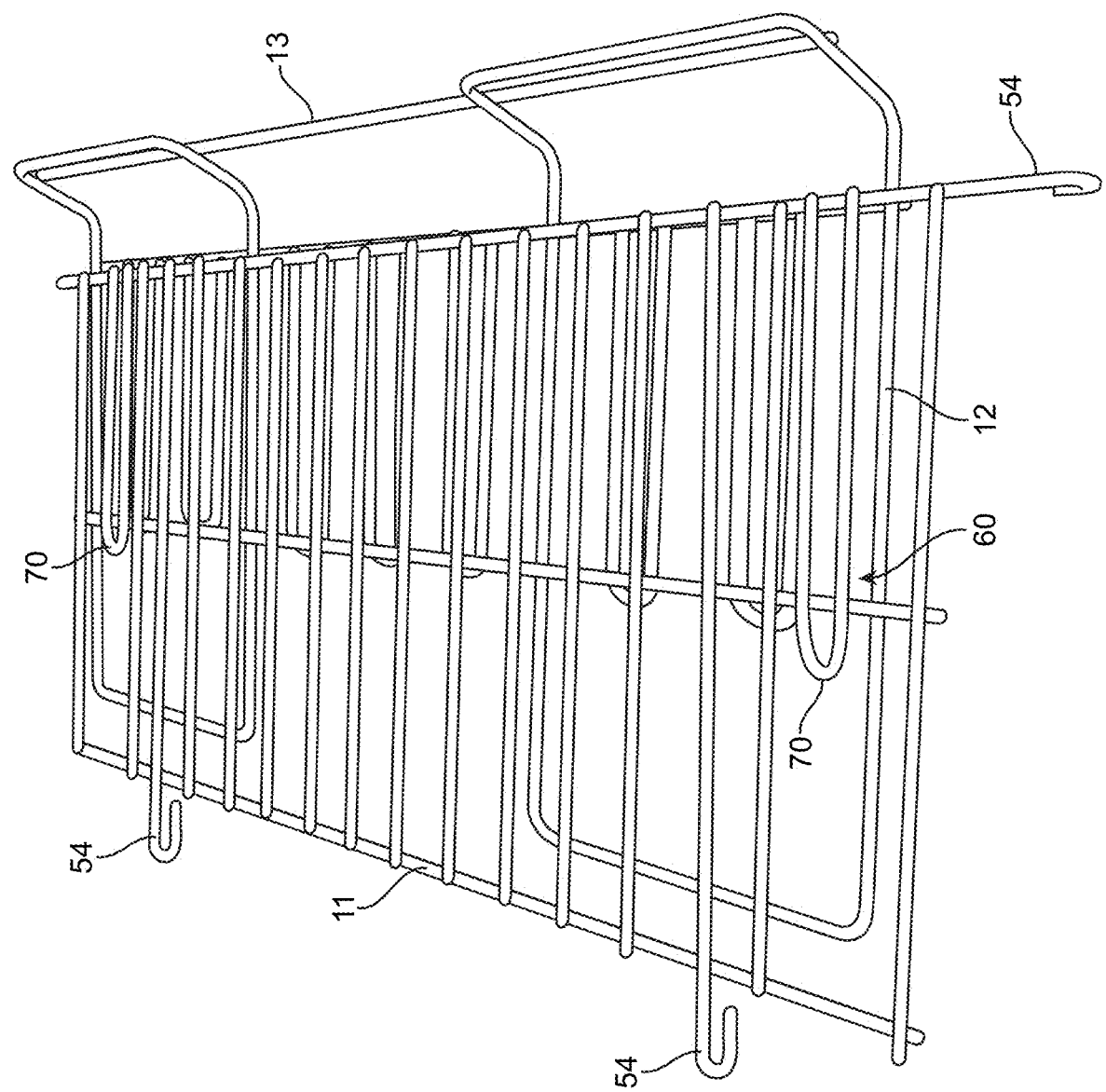
FIG. 9 is similar to FIG. 8, but with the rear portion fully inserted into a slot at the back of the front portion.

FIG. 8 is a perspective view of the front and rear portions 11 and 12 of the telescoping front basket after being assembled together (with the rear portion 12 being partially inserted into slot 50 in front portion 11). Next, FIG. 9 is similar to FIG. 8, but with the rear portion 12 fully inserted into slots 50 and 60 in the front portion 11. As can be seen, slots 50 and 60 will together support back portion 12 received therein.

Importantly, however, the present system also provides an optional stop 70 that ensures that rear portion 12 cannot simply be pulled backwards and fall out of slots 60 and 50.

Figure 10:
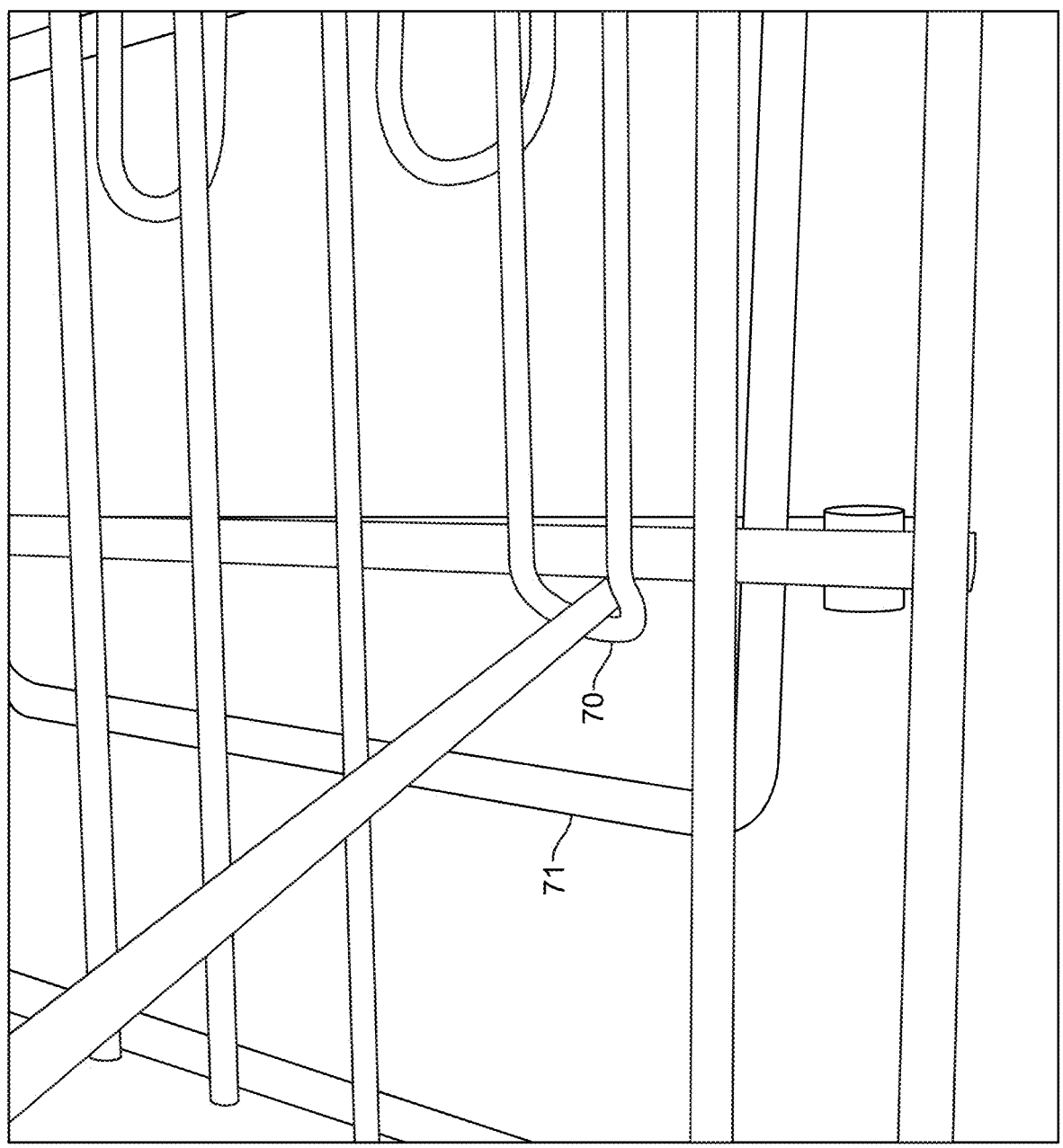
FIG. 10 illustrates the process of forming a stop such that the rear portion of the telescoping basket does not simply fall out of the slot in the front portion of the telescoping basket when pulled fully backwards.

FIG. 10 illustrates the process of forming stop 70 by bending a curved portion of wire into the path of the rear portion 12 of the telescoping basket after the front and rear portions of the telescoping basket have been connected together. Specifically, stop 70 prevents bar 71 on rear portion 12 from slipping through slot 60, such that the rear portion 12 of the telescoping basket does not simply fall out of the front portion 11 of the telescoping basket when pulled fully backwards.

Figure 11:
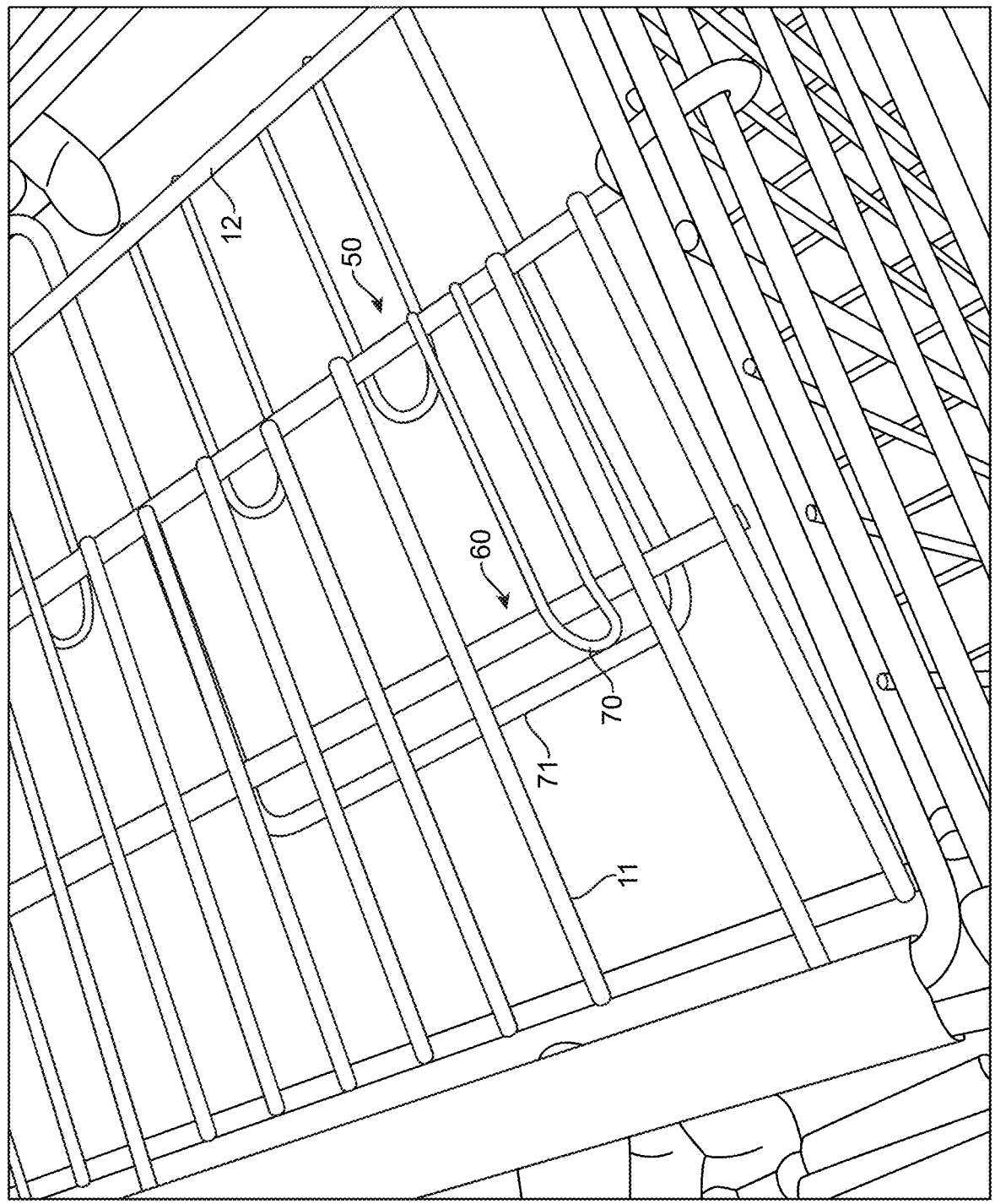
FIG. 11 is a perspective view with the rear portion of the telescoping basket fully extended, showing how the stop prevents the rear portion of the telescoping basket from falling out of a slot in the front portion of the telescoping basket.
Figure 12:
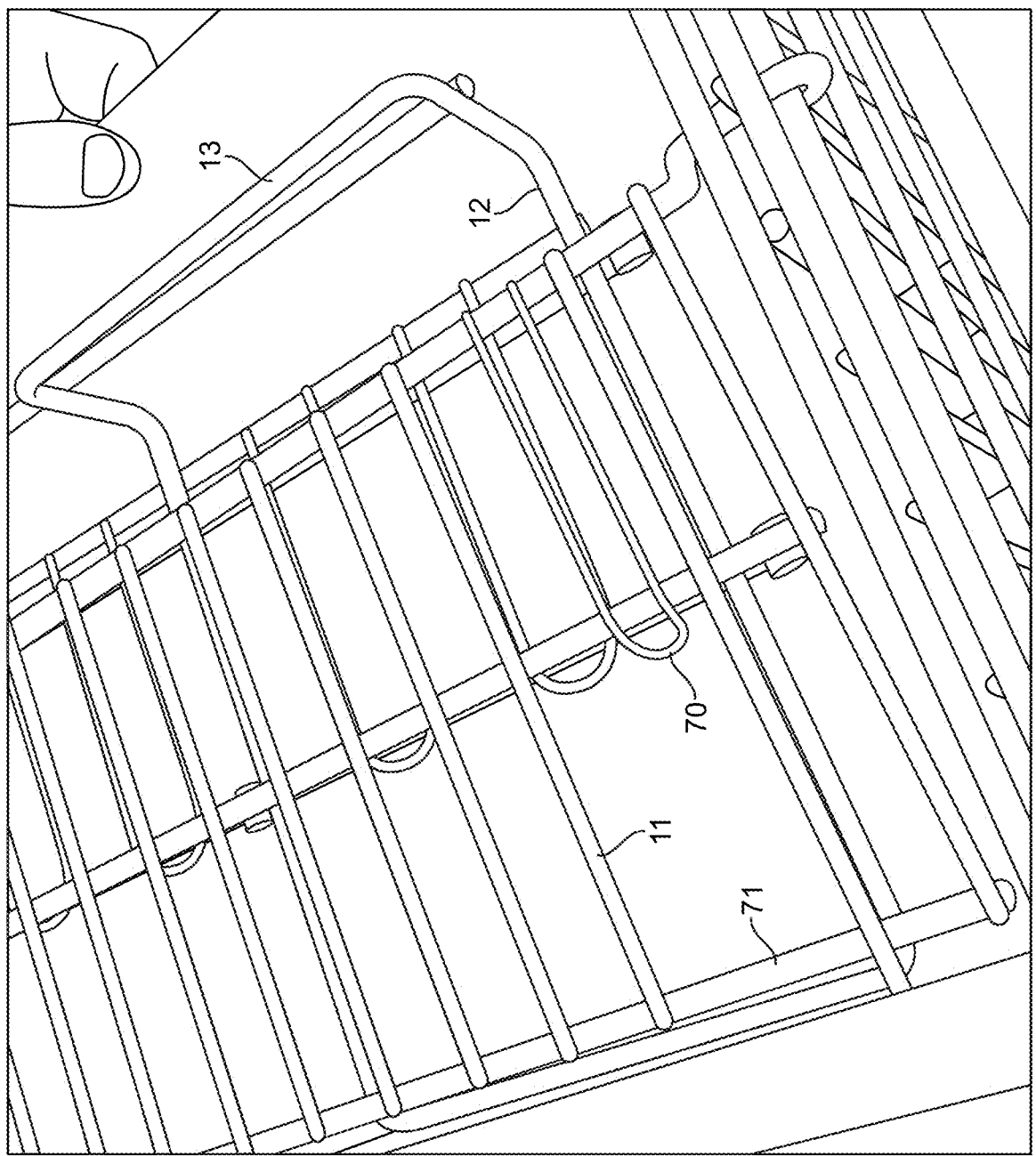
FIG. 12 is similar to FIG. 11, but with the rear portion of the telescoping basket fully inserted into the front portion of the telescoping basket.

The action of stop 70 can also be seen in FIG. 11 where the rear portion 12 is fully retracted (such that bar 71 contacts stop 70 preventing rear portion 12 from passing through slot 60 and falling away from the front portion 11). FIG. 12 illustrates rear portion 12 being pushed fully forward (thereby narrowing the width of the telescoping shelf).

What is claimed is:

1. A shopping cart having a telescoping basket, comprising:
   a shopping cart having a main basket with an upper rim extending therearound; and
   a telescoping basket positioned in a front portion of the main basket, wherein the telescoping basket comprises:
      a front portion attached to the front of the main basket below the upper rim, and
      a rear portion slidably attached to the front portion, wherein the rear portion is slidably moveable between a retracted position and an extended position,
   wherein the rear portion of the telescoping basket is received into at least one slot in the front portion of the telescoping basket,
   wherein the front portion of the telescoping basket comprises a stop that prevents the rear portion of the telescoping basket from being pulled out of the slot in the front portion of the telescoping basket, and
   wherein the stop is formed by bending a wire on the rear portion of the telescoping basket after the rear portion of the telescoping basket has been inserted into the slot in the front portion of the telescoping basket.

2. A shopping cart having a telescoping basket, comprising:
   a shopping cart having a main basket with an upper rim extending therearound; and
   a telescoping basket positioned in a front portion of the main basket, wherein the telescoping basket comprises:
      a front portion attached to the front of the main basket below the upper rim, and a rear portion slidably attached to the front portion,
wherein the rear portion is slidably moveable between a retracted position and an extended position, wherein the rear portion of the telescoping basket is only connected to the front portion of the telescoping basket.

3. The shopping cart of claim 1 or 2, wherein the front portion of the telescoping basket is attached to the front of the main basket below the upper rim of the main basket.

4. The shopping cart of claim 1 or 2, wherein the front and sides of the front portion of the telescoping basket are attached to the main basket.

5. The shopping cart of claim 1 or 2, wherein the telescoping basket is a wire basket.

6. The shopping cart of claim 1 or 2, wherein the rear portion of the telescoping basket comprises an elevated rear safety bar.

* * * * *